(12) United States Patent
Marin et al.

(10) Patent No.: US 7,757,570 B1
(45) Date of Patent: Jul. 20, 2010

(54) TORQUE SENSOR WITH ALIGNMENT SYSTEM

(75) Inventors: Carlos E Marin, Oxford, MI (US); Michael P Portell, Ann Arbor, MI (US); John R. Maten, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/366,807

(22) Filed: Feb. 6, 2009

(51) Int. Cl.
*G01L 3/00* (2006.01)
(52) U.S. Cl. .................................... 73/862.333
(58) Field of Classification Search ............ 73/862.333, 73/862.334, 862.335
See application file for complete search history.

(56) References Cited

U.S. PATENT DOCUMENTS

| | | | | |
|---|---|---|---|---|
| 5,708,216 A | * | 1/1998 | Garshelis | 73/862.335 |
| 6,145,387 A | * | 11/2000 | Garshelis | 73/862.336 |
| 6,257,051 B1 | * | 7/2001 | Boyle et al. | 73/54.01 |
| 6,330,833 B1 | * | 12/2001 | Opie et al. | 73/862.333 |

* cited by examiner

*Primary Examiner*—Jewel Thompson

(57) ABSTRACT

A torque sensor for sensing torque in a rotatable shaft. The rotatable shaft is configured to rotate within a shaft housing. The sensor housing has a first end, a second end, and at least one sensing zone. At least one target zone is disposed on the rotatable shaft and substantially opposes the at least one sensing zone. At least one bearing member is disposed between the sensor housing and the rotatable shaft for limiting relative axial movement and allowing relative rotation between the sensor housing and the rotatable shaft. A first resilient member has a first end in contact with the first end of the sensor housing and a second end in contact with an interior wall of the shaft housing. A second resilient member has a first end in contact with a retaining member and a second end in contact with the second end of the sensor housing.

21 Claims, 1 Drawing Sheet

TORQUE SENSOR WITH ALIGNMENT SYSTEM

FIELD

Figure 1:
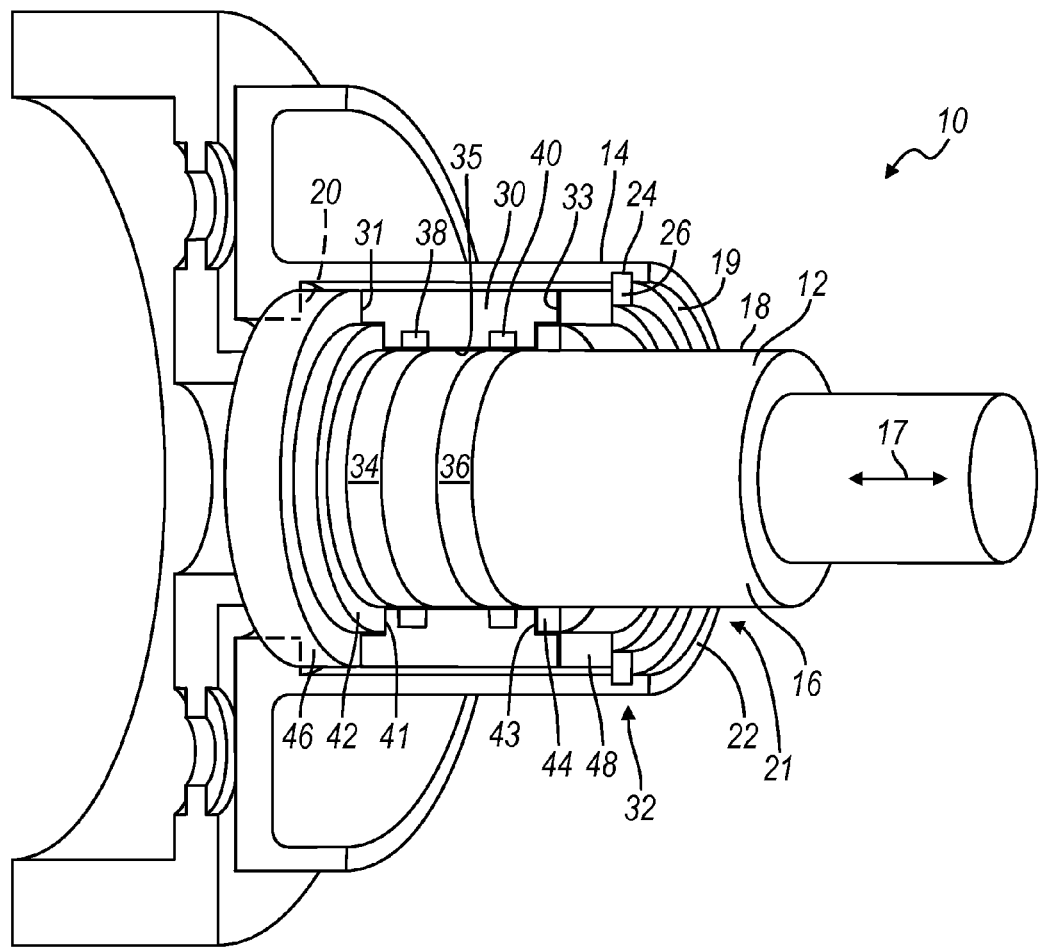

The present disclosure relates to torque sensors, and more particularly to a torque sensor having an axial alignment system.

BACKGROUND

The statements in this section merely provide background information related to the present disclosure and may or may not constitute prior art.

It is often desirable to determine the torque in a rotatable shaft (rotator) relative to a stationary component (stator). A typical application that includes a rotatable shaft and a stator is an automatic transmission in a motor vehicle. In motor vehicle applications, engine torque models are relied upon to properly adapt engine characteristics to motor vehicle requirements and operator demands.

A preferred method of determining the torque being applied to a rotatable shaft in a transmission includes employing a non-contact torque sensor. Common torque sensors include strain gages, magnetic or optical sensors, magnetoelastic sensors, and surface acoustic wave (SAW) sensors. These torque sensors each measure various parameters such as local strain, angular displacement, or strained-induced change on a magnetic field. Typically these torque sensors have two components. The first component is generally referred to as a transmitter and the second component is generally referred to as a receiver. The receiver is typically coupled to the stator and the transmitter is typically coupled to the rotatable shaft. In the case of magnetoelastic sensors, a current is induced through the receiver and torque applied on the rotatable shaft is transmitted back to the receiver in the form of a magnetic field which is then converted into an estimated torque. One crucial element to determining the amount of torque using these sensors is knowing and controlling the axial alignment of the transmitter relative to the receiver.

Accordingly, one limitation of the above described torque sensors is that a discrepancy in the expected axial alignment of the transmitter relative to the receiver can increase the margin of error in the torque calculation. Tolerance stack and operating end play in automotive transmissions may lead to misalignment of the receiver and the transmitter. Moreover, the system tolerances between the rotatable shaft and the stator are often not precisely known, and therefore the expected axial alignment of the transmitter relative to the receiver will be an estimate. Therefore, there is a need in the art to provide a device that reduces the error between the expected axial alignment of the transmitter relative to the receiver and the actual axial alignment of the transmitter relative to the receiver.

SUMMARY

The present invention provides a torque sensor for sensing torque on a rotatable shaft disposed in a shaft housing. The shaft housing has an interior wall and an open end.

In a first aspect of the present invention, a sensor housing at least partially circumscribes the rotatable shaft. The sensor housing has a first end, a second end, and at least one sensing zone. At least one target zone is disposed on the rotatable shaft and substantially opposes the at least one sensing zone. At least one bearing member is disposed between the sensor housing and the rotatable shaft for limiting relative axial movement and allowing relative rotation between the sensor housing and the rotatable shaft. A first resilient member has a first end in contact with the first end of the sensor housing and a second end in contact with the interior wall of the shaft housing. A second resilient member has a first end in contact with the second end of the sensor housing and a second end in contact with a retaining member connectable to the open end of the shaft housing.

In another aspect of the present invention, a magnetic field is produced in the at least one sensing zone.

In yet another aspect of the present invention, the at least one target zone includes a magnetostrictive material disposed on the rotatable shaft.

In yet another aspect of the present invention, the at least one bearing member is a needle bearing.

In yet another aspect of the present invention, the at least one sensing zone is a pair of sensing zones, the at least one target zone is a pair of target zones, and the at least one bearing member is a pair of bearing members.

In yet another aspect of the present invention, the pair of bearing members are disposed in annular notches disposed on an inner diameter of the sensor housing adjacent the first end and the second end of the sensor housing.

In yet another aspect of the present invention, the pair of target zones are adjacent the pair of bearing members.

In yet another aspect of the present invention, the retaining member is a snap ring disposed in a groove of the shaft housing.

In yet another aspect of the present invention, the first resilient member and the second resilient member are wave shaped plates.

In yet another aspect of the present invention, the first resilient member and the second resilient member are coil springs.

In yet another aspect of the present invention, the first resilient member and the second resilient member are substantially comprised of rubber.

In yet another aspect of the present invention, the first resilient member and the second resilient member are substantially comprised of plastic.

Further areas of applicability will become apparent from the description provided herein. It should be understood that the description and specific examples are intended for purposes of illustration only and are not intended to limit the scope of the present disclosure.

DRAWING

The drawing described herein is for illustration purposes only and is not intended to limit the scope of the present disclosure in any way.

FIG. 1 is an isometric view of an exemplary stator and an exemplary rotatable shaft having a torque sensor system according to the principles of the present invention.

DETAILED DESCRIPTION

The following description is merely exemplary in nature and is not intended to limit the present disclosure, application, or uses.

With reference to FIG. 1, a torque sensor system 10 according to the principles of the present invention is shown with an exemplary first annular component 12 and an exemplary second annular component 14. The first annular component 12 is preferably a rotatable shaft, though other annular components may be employed without departing from the scope of the present invention. The first annular component 12 includes an axial portion 16 that defines an axis 17. The axial portion 16 has an outer surface 18. The first annular component 12 is rotatable about the axis 17. The second annular component 14 is preferably a portion of a shaft housing or other transmission housing component, though other annular components may be employed without departing from the scope of the present invention. The second annular component 14 includes an interior surface 19 that defines a bore 21. The interior surface 19 includes an interior wall 20 substantially disposed on a plane normal to the axis 17. The second annular component 14 further includes an open end 22 that communicates with the bore 21 and is disposed opposite the interior wall 20. A groove 24 is disposed in the interior wall 19 of the second annular component 14 proximate the open end 22. Within the groove 24 is a retaining member 26. In the example provided, the retaining member 26 is a snap ring. However, it should be appreciated that other retaining mechanisms may be used, and that the groove 24 may not be required. The first annular member 12 is disposed within the second annular member 14 such that the axial portion 16 of the first annular member 12 is located at least partially within the bore 21 of the second annular member 14.

The torque sensor system 10 is operable to detect an amount of torque within the first annular component 12, as will be described in greater detail below. The torque sensor system 10 includes a sensor housing 30, an axial alignment system 32, a first target zone 34 and a second target zone 36. The first and second target zones 34, 36 are rings of magnetostrictive material secured to the first annular component 12. It should be appreciated that the first and second target zones 34, 36 may have various other configurations including having other materials, members or features used with other types of sensors without departing from the scope of the present invention. The first target zone 34 is secured to the outer surface 18 of the first annular component 12 and circumscribes the axis 17. The second target zone 36 is located proximate the first target zone 34. The second target zone 36 is also secured to the outer surface 18 of the first annular component 12 and circumscribes the axis 17. It should be understood that the number of target zones, spacing between target zones, and sizes of target zones may vary without departing from the scope of the present invention. In the example provided, the first target zone 34 and the second target zone 36 are operable to alter an induced magnetic field in accordance with operating principles of magnetoelastic sensors.

The sensor housing 30 includes at least one sensor (not shown) that detects torque in the first annular component 12. The sensor housing 30 is radially disposed between the first annular component 12 and the second annular component 14, and axially disposed between the interior wall 20 and the retaining member 26. The sensor housing 30 has a first end 31 adjacent the interior wall 20 and a second end 33 adjacent the retaining member 26. A first annular slot 41 is disposed at the first end 31 on an inner surface 35 of the sensor housing 30. A second annular slot 43 is disposed at the second end 33 on the inner surface 35 of the sensor housing 30. The sensor housing 30 has a first sensing zone 38 that substantially opposes the first target zone 34. The sensor housing 30 also has a second sensing zone 40 that substantially opposes the second target zone 36. The first sensing zone 38 and the second sensing zone 40 are operable to detect information transmitted by the first target zone 34 and the second target zone 36, respectively. In the example provided, the first sensing zone 38 and the second sensing zone 40 correspond to the axial positions of four sets of magnetic field sensor coils equally spaced about the circumference of the sensor housing 30. However, the sensor housing 30 does not need to completely circumscribe the axis 17 and may contain other numbers and types of sensors without departing from the scope of the present invention. Torque that is applied to the first annular component 12 stresses the magnetostrictive material within the first and second target zones 34 and 36. This stress alters the magnetic field emanating from the target zones 34 and 36 such that the output is indicative of the torque being applied to the first annular component 12. The first and second sensing zones 38 and 40 detect the change in the magnetic field. Using the pre-defined axial distance between the sensing zones 38 and 40 and the target zones 34 and 36, a controller (not shown) is able to determine the torque being applied to the first annular component 12. It should be appreciated that the stress on the first annular component 12 may alter the output from the target zones 34 and 36 in different ways (i.e. angular displacement or acoustic wave) when other sensor types are used without departing from the scope of the present invention.

The axial alignment system 32 is operable to maintain the axial position of the sensor housing 30 relative to the second annular member 14. The axial alignment system includes a first sliding mechanism or first bearing member 42 and a second sliding mechanism or second bearing member 44 disposed between the first annular component 12 and the sensor housing 30. More specifically, the first bearing member 42 is located in the first annular slot 41 of the sensor housing. The second bearing member 44 is located in the second annular slot 43 of the sensor housing 30. The first bearing member 42 and the second bearing member 44 are operable to allow the first annular component 12 to rotate relative to the sensor housing 30 and transmit axial force to the sensor housing 30. The first bearing member 42 and the second bearing member 44 are fixed axially to the first annular component 12 and to the sensor housing 30. In the example provided, the first bearing member 42 and the second bearing member 44 are needle bearings having an outer member attached to the sensor housing 30 and an inner member attached to the first annular component 12. As the first annular component 12 moves axially, force is transmitted through the first member and second member to move the sensor housing 30. However, it should be appreciated that other types and numbers of sliding or bearing systems may be used without departing from the present invention.

The axial alignment system also includes a first resilient member 46 and a second resilient member 48. The first and second resilient members 46 and 48 are operable substantially to hold the sensor housing 30 rotationally stationary by friction force while allowing the sensor housing 30 to move axially as the resilient members 46 and 48 compress. The first resilient member abuts the interior wall 20 of the second annular member 14 and abuts the first end 31 of the sensor housing 30. As the sensor housing 30 moves axially towards the first wall 20, the first end 31 compresses the first resilient member 46 to accommodate axial movement of the sensor housing 30 toward the interior wall 20. The second resilient member 48 abuts the retaining member 26 and the second end 33 of the sensor housing 30. As the sensor housing 30 moves axially towards the open end 22, the second end 33 compresses the second resilient member 48 to accommodate axial movement of the sensor housing 30 toward the retaining member 26. The first resilient member 46 and the second resilient member 48 may be any suitable compressible member, including but not limited to: coil springs, wave shaped plates, plastic members, and rubber members. In the example provided, the first resilient member 46 and the second resilient member 48 are compressed upon assembling the torque sensor 10 so that frictional forces keep them in the desired position. However, the first resilient member 46 may be attached to either or both of the interior wall 20 and the first end 31 of the sensor housing 30. The second resilient member 48 may be attached to either or both of the retaining member 26 and the second end 33 of the sensor housing 30 without departing from the scope of the present invention.

As the first annular component 12 moves along axis 17, force is transmitted through the first bearing member 42 and the second bearing member 44 to the sensor housing 30. The force on sensor housing 30 is transmitted to the first resilient member 46 or the second resilient member 48. One of the resilient members compresses, allowing the sensor housing 30 to move along axis 17 with the first annular member 12. As the sensor housing 30 and the first annular component 12 move together, the first sensing zone 38 remains substantially opposed to the first target zone 34, and the second sensing zone 40 remains substantially opposed to the second target zone 36. Thus, the sensors within sensor housing 30 remain within a given sensitivity tolerance required for operation. It should be appreciated that other types and numbers of components may be used as identified above.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque sensor for sensing torque in a rotatable shaft, wherein the rotatable shaft is configured to rotate within a shaft housing having an interior wall and an open end, the torque sensor comprising:
    a sensor housing at least partially circumscribing the rotatable shaft, the sensor housing having a first end, a second end, and at least one sensing zone;
    at least one target zone disposed on the rotatable shaft, wherein the at least one target zone is substantially opposing the at least one sensing zone;
    at least one bearing member disposed between the sensor housing and the rotatable shaft for limiting relative axial movement and allowing relative rotation between the sensor housing and the rotatable shaft;
    a first resilient member having a first end in contact with the first end of the sensor housing and a second end in contact with the interior wall of the shaft housing; and
    a second resilient member having a first end in contact with the second end of the sensor housing and a second end in contact with a retaining member connectable to the open end of the shaft housing.

2. The torque sensor of claim 1, wherein a magnetic field is produced in the at least one sensing zone.

3. The torque sensor of claim 2, wherein the at least one target zone includes a magnetostrictive material disposed on the rotatable shaft.

4. The torque sensor of claim 1, wherein the at least one bearing member is a needle bearing.

5. The torque sensor of claim 1, wherein the at least one sensing zone is a pair of sensing zones, the at least one target zone is a pair of target zones, and the at least one bearing member is a pair of bearing members.

6. The torque sensor of claim 5, wherein the pair of bearing members are disposed in annular notches disposed on an inner diameter of the sensor housing adjacent the first end and the second end of the sensor housing.

7. The torque sensor of claim 5, wherein the pair of target zones are adjacent the pair of bearing members.

8. The torque sensor of claim 1, wherein the retaining member is a snap ring disposed in a groove of the shaft housing.

9. The torque sensor of claim 1, wherein the first resilient member and the second resilient member are wave shaped plates.

10. The torque sensor of claim 1, wherein the first resilient member and the second resilient member are coil springs.

11. The torque sensor of claim 1, wherein the first resilient member and the second resilient member are substantially comprised of rubber.

12. The torque sensor of claim 1, wherein the first resilient member and the second resilient member are substantially comprised of plastic.

13. A torque sensor for sensing torque in a rotatable shaft, wherein the rotatable shaft is configured to rotate within a shaft housing having an interior wall and an open end, the torque sensor comprising:
    a sensor housing at least partially circumscribing the rotatable shaft, the sensor housing having a first end, a second end, and a pair of sensing zones, wherein a magnetic field is produced in the pair of sensing zones;
    a pair of target zones disposed on the rotatable shaft, wherein the pair of bearing members include magnetostrictive material and substantially oppose the pair of sensing zones;
    a pair of bearing members disposed between the sensor housing and the rotatable shaft for limiting relative axial movement and allowing relative rotation between the sensor housing and the rotatable shaft;
    a first resilient member having a first end in contact with the first end of the sensor housing and a second end in contact with the interior wall of the shaft housing; and
    a second resilient member having a first end in contact with the second end of the sensor housing and a second end in contact with a retaining member connectable to the open end of the shaft housing.

14. The torque sensor of claim 13, wherein the pair of bearing members is a pair of needle bearings.

15. The torque sensor of claim 13, wherein the pair of bearing members are disposed in annular notches disposed on an inner diameter of the sensor housing adjacent the first end and the second end of the sensor housing.

16. The torque sensor of claim 13, wherein the pair of target zones are adjacent the pair of bearing members.

17. The torque sensor of claim 13, wherein the retaining member is a snap ring disposed in a groove of the shaft housing.

18. The torque sensor of claim 13, wherein the first resilient member and the second resilient member are wave shaped plates.

19. The torque sensor of claim 13, wherein the first resilient member and the second resilient member are coil springs.

20. The torque sensor of claim 13, wherein the first resilient member and the second resilient member are substantially comprised of rubber.

21. The torque sensor of claim 13, wherein the first resilient member and the second resilient member are substantially comprised of plastic.

* * * * *